United States Patent
Tosco et al.

(10) Patent No.: US 8,851,545 B2
(45) Date of Patent: Oct. 7, 2014

(54) VEHICLE EQUIPPED WITH A LUGGAGE COMPARTMENT HAVING A HEIGHT-ADJUSTABLE LOADING FLOOR

(71) Applicant: C.R.F. Societa' Consortile per Azioni, Orbassano (IT)

(72) Inventors: Franco Tosco, Orbassano (IT); Giorgio Masoero, Orbassano (IT); Alberto Caruso, Orbassano (IT); Angelo Storgato, Orbassano (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 0 days.

(21) Appl. No.: 13/968,502

(22) Filed: Aug. 16, 2013

(65) Prior Publication Data
US 2014/0054917 A1    Feb. 27, 2014

(30) Foreign Application Priority Data

Aug. 17, 2012    (EP) .................................... 12180911

(51) Int. Cl.
*B60N 3/00*    (2006.01)
*B60R 5/04*    (2006.01)
(52) U.S. Cl.
CPC .. *B60R 5/045* (2013.01); *B60R 5/04* (2013.01)
USPC ........................................................ 296/24.4
(58) Field of Classification Search
CPC ............ B60R 5/04; B60R 7/02; B60N 2/305; B60N 2/36; B23K 37/047; B60P 1/003; B64D 11/003
USPC ..................... 296/24.4, 37.14, 37.16
See application file for complete search history.

(56) References Cited

U.S. PATENT DOCUMENTS

| | | | | |
|---|---|---|---|---|
| 5,061,002 A | * | 10/1991 | Saso | 296/37.3 |
| 5,080,417 A | * | 1/1992 | Kanai | 296/37.3 |
| 5,257,846 A | * | 11/1993 | Kanai et al. | 296/37.14 |
| 5,799,845 A | * | 9/1998 | Matsushita | 224/42.14 |
| 5,967,054 A | * | 10/1999 | Rosenfeld | 108/44 |
| 5,971,462 A | * | 10/1999 | Bell et al. | 296/37.3 |
| 5,979,962 A | * | 11/1999 | Valentin et al. | 296/37.1 |
| 6,033,003 A | * | 3/2000 | Bell et al. | 296/37.3 |
| 6,050,202 A | * | 4/2000 | Thompson | 108/44 |
| 6,155,625 A | * | 12/2000 | Felix | 296/37.14 |
| 6,231,096 B1 | * | 5/2001 | Bollmann et al. | 296/37.16 |
| 6,273,487 B1 | * | 8/2001 | Schurig et al. | 296/37.14 |
| 6,290,277 B1 | * | 9/2001 | Spykerman et al. | 296/24.43 |
| 6,406,083 B2 | * | 6/2002 | Bharj et al. | 296/37.16 |

(Continued)

FOREIGN PATENT DOCUMENTS

| | | |
|---|---|---|
| DE | 198 15 466 A1 | 10/1999 |
| DE | 199 41 714 A1 | 3/2001 |
| DE | 20 2006 007 784 U1 | 9/2006 |

*Primary Examiner* — Kiran B Patel
(74) *Attorney, Agent, or Firm* — Dickstein Shapiro LLP

(57) ABSTRACT

A vehicle is provided with a luggage compartment that houses an additional support unit having a loading floor, height-adjustable between a lowered position and at least one raised position; the unit has two levers hinged to a fixed structure about a first horizontal axis and to the loading floor about a second horizontal axis, parallel to the first one; when placed in the raised position, the loading floor is supported, but can be rotated upwards about the second horizontal axis; the levers carry respective appendages, which rest on fixed brackets to support the loading floor in the raised position.

11 Claims, 4 Drawing Sheets

(56) References Cited

U.S. PATENT DOCUMENTS

| | | | |
|---|---|---|---|
| 6,439,633 B2* | 8/2002 | Nemoto | 296/37.14 |
| 6,644,710 B2* | 11/2003 | Seel et al. | 296/37.5 |
| 6,773,046 B2* | 8/2004 | Nakamitsu et al. | 296/37.16 |
| 6,811,196 B2* | 11/2004 | Gammon | 296/37.1 |
| 7,017,980 B1* | 3/2006 | Bejin et al. | 296/193.07 |
| 7,059,646 B1* | 6/2006 | DeLong et al. | 296/24.43 |
| 7,179,040 B2* | 2/2007 | Masuda et al. | 414/462 |
| 7,182,382 B2* | 2/2007 | Harima et al. | 296/37.2 |
| 7,188,881 B1* | 3/2007 | Sturt et al. | 296/26.1 |
| 7,762,602 B2* | 7/2010 | Bohlke et al. | 296/37.16 |
| 7,794,004 B2* | 9/2010 | Aebker et al. | 296/37.8 |
| 8,172,295 B2* | 5/2012 | Fischer et al. | 296/24.43 |
| 8,205,926 B2* | 6/2012 | Beckley et al. | 296/37.14 |
| 8,215,691 B2* | 7/2012 | Ewing | 296/26.02 |
| 8,534,736 B1* | 9/2013 | Whalen | 296/37.16 |
| 8,720,969 B2* | 5/2014 | Young | 296/97.23 |
| 2001/0022451 A1* | 9/2001 | Ando et al. | 296/37.16 |
| 2002/0070574 A1* | 6/2002 | Carlsson et al. | 296/37.14 |
| 2004/0105744 A1* | 6/2004 | Warner et al. | 414/522 |
| 2006/0016840 A1* | 1/2006 | Svenson et al. | 224/42.32 |
| 2006/0145501 A1* | 7/2006 | Warner et al. | 296/37.3 |
| 2008/0038101 A1* | 2/2008 | Klatt | 414/345 |
| 2014/0117695 A1* | 5/2014 | Murru | 296/24.44 |

* cited by examiner

VEHICLE EQUIPPED WITH A LUGGAGE COMPARTMENT HAVING A HEIGHT-ADJUSTABLE LOADING FLOOR

The present invention relates to a vehicle equipped with a luggage compartment having a height-adjustable loading floor.

BACKGROUND OF THE INVENTION

German utility model DE202006007784U1 teaches providing an additional loading floor in a luggage compartment. The additional loading floor is movable between a lowered position and a raised position and is constrained to the bottom floor of the luggage compartment by levers. When the loading floor is in the lowered position, these levers are housed in a longitudinal slot made in a front portion of the loading floor. The levers have a first end, hinged to the bottom floor about a first horizontal axis, and a second end, which is opposite to the first and is guided by the slot so that it slides in a longitudinal direction when the loading floor is raised and is then manually pulled backwards, towards the outside of the luggage compartment.

When the second end of the levers comes out from the slot, the loading floor can rotate with respect to the levers about a second horizontal axis parallel to the first and then be placed in the raised position. In particular, elastic elements are provided to push the second end of the levers outside of the slot and thus facilitate the manoeuvres of raising the loading floor.

When the loading floor is placed in its raised position, the weight of the luggage is discharged onto the levers and a cross-beam provided at the rear end of the loading floor, i.e. at the entry sill of the luggage compartment.

This solution is not very satisfactory because the levers substantially perform the function of struts to support the weight when the loading floor is placed in its raised position. Due to vibrations when the vehicle is driven, the stresses acting on the hinges and on the guide defined by the slot tend to cause wear, with the consequent generation of excess play, noise and malfunctioning of the load-floor positioning manoeuvres.

In addition, always when the loading floor is placed in its raised position, if the loading floor is used like a hatch, or rather it is opened to gain access to the underlying space, the angular position of the levers becomes unstable.

SUMMARY OF THE INVENTION

The object of the present invention is that of providing a vehicle equipped with a luggage compartment having a height-adjustable loading floor, which enables the above-described drawbacks to be resolved in a simple and inexpensive manner and, preferably, allows the above-described solution of the known art to be simplified.

According to the present invention, a vehicle is provided as defined in claim 1.

BRIEF DESCRIPTION OF THE DRAWINGS

For a better understanding of the present invention a preferred embodiment will now be described, purely by way of a non-limitative example, with reference to the attached drawings, where.

DETAILED DESCRIPTION OF THE INVENTION

Figure 1:
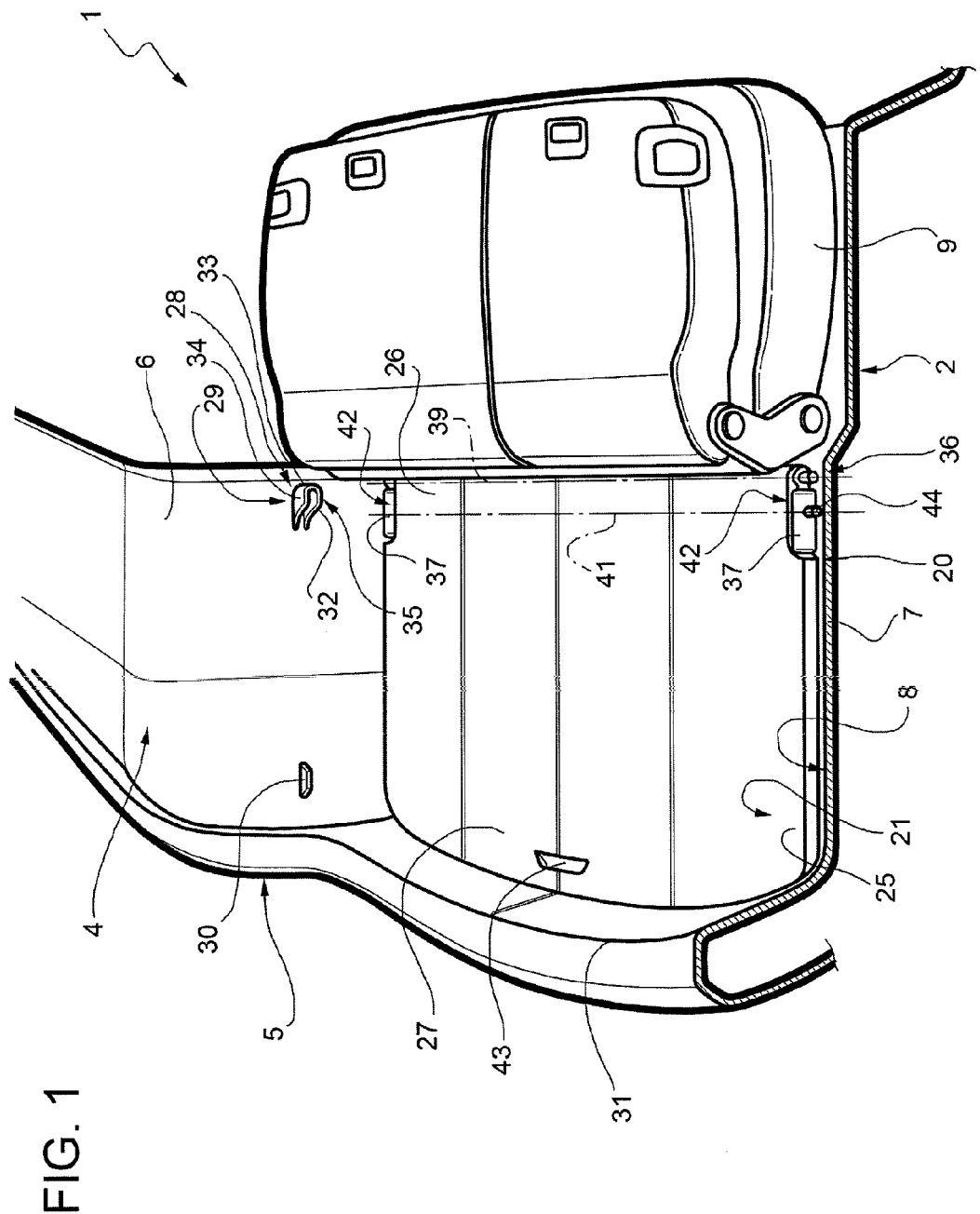
FIG. 1 shows, in perspective and in a simplified manner with parts removed for clarity, a preferred embodiment of the vehicle equipped with a luggage compartment having a height-adjustable loading floor according to the present invention.

In FIG. 1, reference numeral 1 indicates, as a whole, a vehicle 1 (partially shown) comprising a structure 2 (partially shown) that defines a luggage compartment 4, to which access can be gained through a rear opening 5. In particular, the structure comprises two sides 6, of which only one is shown, and a bottom floor 7 having a substantially horizontal upper surface 8, upon which luggage can be stood (not shown). According to a variant that is not shown, at least part of the bottom floor 7 can be liftable, like a hatch for example, to provide access to an underlying compartment that houses a spare wheel and/or a toolkit for the vehicle, and/or an empty underlying compartment provided for stowing miscellaneous objects. The luggage compartment 4 is delimited at the front by a rear seat 9, which preferably has a fold-down seatback to place the luggage compartment 4 in communication with the passenger compartment of the motor vehicle 1 and extend the luggage space.

The vehicle 1 also comprises a unit 20 to enable standing luggage on an additional surface 21 and to obtain an underlying space 22 (FIG. 3) between surfaces 21 and 8.

The unit 20 comprises a loading floor 25 defined by a single panel having surface 21 as the upper surface. The loading floor 25 has a width substantially equal to that of the luggage compartment 4 and is height-adjustable, i.e. a user can manually move it between a lowered position and at least one raised position, with respect to the bottom floor 7. In the lowered position, the loading floor 25 is positioned just above surface 8, or rests directly on surface 8, and hence the underlying space 22 is absent and it is only possible to stand luggage on surface 21.

The unit 20 also comprises a support device 28 to support the loading floor 25, and consequently the luggage, when the loading floor 25 is placed in its raised position. In particular, the support device 28 comprises at least two front brackets 29, connected to the structure 2 in a fixed position, preferably on the sides 6, to indirectly support a front portion 26 of the loading floor 25, as will be described in greater detail hereinafter.

Furthermore, the support device 28 also comprises at least one rear support, to support a rear portion 27 of the loading floor 25. In particular, two brackets 30 are provided, connected to the sides 6 and substantially aligned with the front brackets 29, parallel to the longitudinal direction of travel of the vehicle 1. When the loading floor 25 is placed in the raised position, the rear edge of the rear portion 27 is adjacent to a cross-beam 31 that defines the bottom sill of the rear opening 5, so as not to leave a gap between the loading floor 25 and the cross-beam 31.

Preferably, each of the front brackets 29 comprises: a lower wall 32, which is substantially horizontal to support the weight discharged by the front portion 26; a front wall 33, which defines a stop to arrest the longitudinal forward movement of the loading floor 25; and an upper wall 34 facing the lower wall 32 so as to define a seat 34.

The unit 20 also comprises a lever device 36 that connects the loading floor 25 to the structure 2 to guide and facilitate moving the loading floor 25 between the raised and lowered positions.

Figure 3:
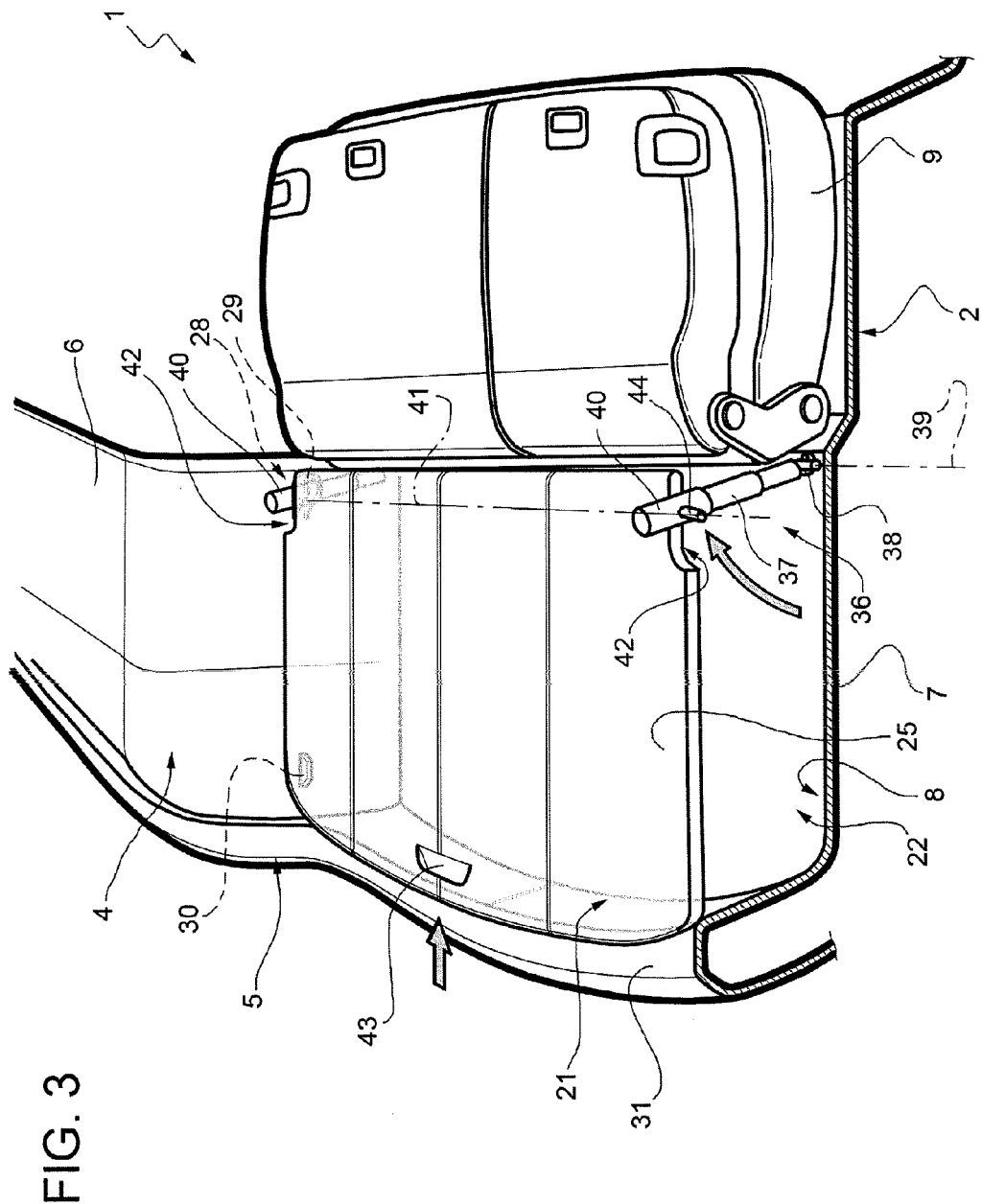

With reference to FIG. 3, the lever device 36 is formed by two levers 37, each of which has an end portion 38 hinged to the structure 2 about a fixed horizontal axis 39, orthogonal to the longitudinal direction of travel of the vehicle 1, and an end portion 40 that is opposite to end portion 38 and is hinged to the front portion 26 about a horizontal axis 41, parallel to axis 39. The levers 37 are arranged on opposite lateral sides of the front portion 26.

According to a variant that is not shown, the lever device 36 is formed by a single lever, defined for example by a plate hinged to the front edge of the front portion 26.

Preferably, the distance between axes 39 and 41 is variable, in particular because the levers 37 are telescopic, so that the levers 37 can be shortened when the loading floor 25 is placed in its lowered position (FIG. 1) and/or to adjust the height position of the loading floor 25 and thus the size of the underlying space 22 when the loading floor 25 is placed in its raised position. To perform this last function, the support device 28 comprises a plurality of brackets (not shown) placed at different heights and selectable to support the loading floor 25 at the desired height, and/or the brackets 29 and 30 have a height-adjustable position, along the sides 6, in a manner that is not shown.

In particular, the levers 37 comprise respective retaining devices, not shown, which are able to maintain the set length if a pulling/pushing force exceeding a given force is not applied to the levers 37. For example, these retaining devices can be of the snap-fit type and define a plurality of predefined reference positions, corresponding to the different heights at which the loading floor 25 can be positioned.

With reference to FIG. 1, when the loading floor 25 is placed in the lowered position, the levers 37 are substantially parallel to surface 21 and are housed in respective recesses 42 along the sides of the front portion 26.

The loading floor 25 can be manually moved between the raised and lowered positions by acting on a grip portion 43 made in the rear portion 27. In particular, starting from the lowered position and lifting the grip portion 43, the loading floor 25 is made to turn about at least one of axes 39 and 41, until the rear edge of the rear portion 27 exceeds the height of the cross-beam 31. Preferably, the positions of the brackets 30 in the longitudinal direction on the sides 6 are set so as not to cause interference with the rear portion 27 during this upward rotation.

Then, by pulling the grip portion 43 outwards from the luggage compartment 4, substantially in the direction defined by the loading floor 25 and by the levers 37, the levers 37 become elongated (FIG. 2) and the loading floor 25 passes above the brackets 30. Thanks to the above-mentioned retaining devices, the extension applied to the levers 37 is also maintained during the subsequent manoeuvres.

At this point, by letting the rear portion 27 come down, the latter can rest on the brackets 30 and/or on the cross-beam 31. At the same time, the rear portion 27 is pushed forwards so as to make the levers 37 rotate about axis 39 until they engage the front brackets 29.

If the grip portion 43 is pulled outwards from the luggage compartment 4, the loading floor 25 can be withdrawn from the front brackets 29 and be placed in the rest position again, substantially by following a sequence of operations in reverse to those described above.

Alternatively, by pulling the grip portion 43 upwards when the loading floor 25 is in the raised position, the loading floor 25 can rotate upwards about axis 41, without disengaging the front brackets 29, to allow access to the underlying space 22, which is hidden from view from outside the vehicle 1 (precisely thanks to the loading floor 25).

According to one aspect of the present invention, the unit 20 comprises two appendages 44, which are carried on the end portions 40 and project in opposite directions along a direction parallel to axis 41 so as to respectively engage the front brackets 29 when the loading floor 25 reaches its raised position. In this position, in particular, a lower surface of the appendages 44 rests on the lower walls 32.

In particular, when the appendages 44 engage the front brackets 29, they remain locked in a releasable manner in the seats 35, against the front walls 33, and so the loading floor 25 remains in a fixed longitudinal position. For example, this locking can be defined by a deformability and by a special shape of the seats 35 and the appendages 44; or by a spring system (not shown), for example, comprising an elastic element carried by the front brackets 29 and having a bulge that couples with the appendages 44, but which disengages from the latter when adequate traction or pressure is applied.

Thanks to the coupling of the levers 37 to the structure 2, it is possible to freely rotate the rear portion 27 upwards without longitudinal movements of the loading floor 25 and without having to provide positioning springs to push the levers 37 in rotation about axis 39. Preferably, the appendages 44 extend along axis 41.

In the embodiment shown, the appendages 44 are firmly fastened to the end portion 40. According to a variant that is not shown, the appendages 44 are movable with respect to the levers 37 (or with respect to the individual lever 37), so as to selectively assume a rest position, in which the appendages 44 are retracted from and/or at the side of the levers 37, to reduce the space occupied and the risks of interference with the sides 6 when the loading floor 25 needs to be moved, and an operative position, in which they effectively project with respect to the end portions 40 when the loading floor 25 must be placed in its raised position. For example, the appendages 44 could slide in opposite directions to retract into respective seats, or could be hinged to the levers 37. For example, the movement of the appendages 44 between the rest and operative positions could be made automatic, based on the relative rotation between the loading floor 25 and the levers 37 about axis 41, by means of a cam and follower mechanism for example, or it could be triggered by manually operating a control mounted, for example, on the rear portion 27.

According to a further variant that is not shown, the end portions 40 could have shoulders or edges that can engage the front brackets 29, without providing special protrusions or appendages.

Figure 2:
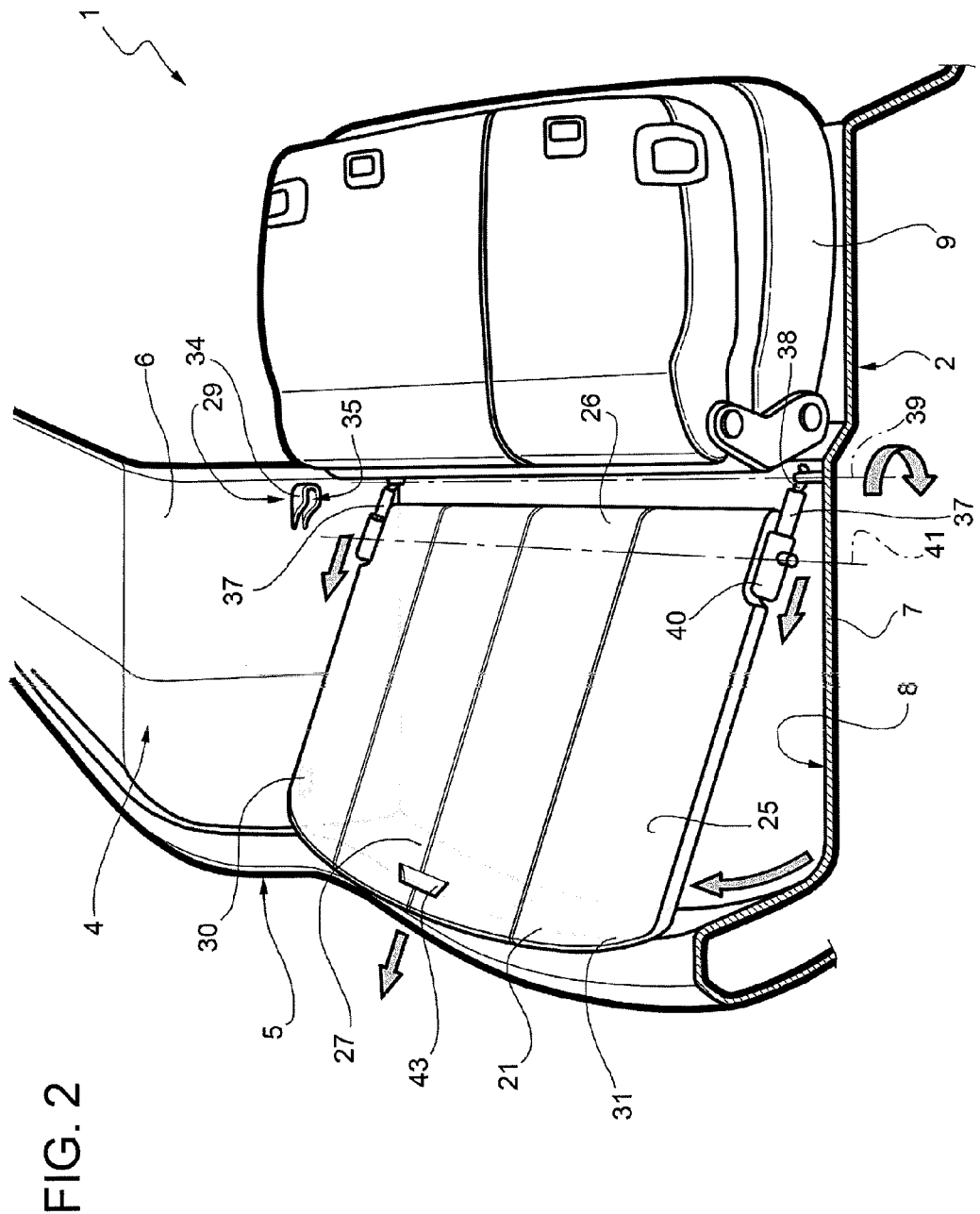
FIGS. 2 and 3 are similar to FIG. 1 and show two steps of adjusting the height of the loading floor.
Figure 4:
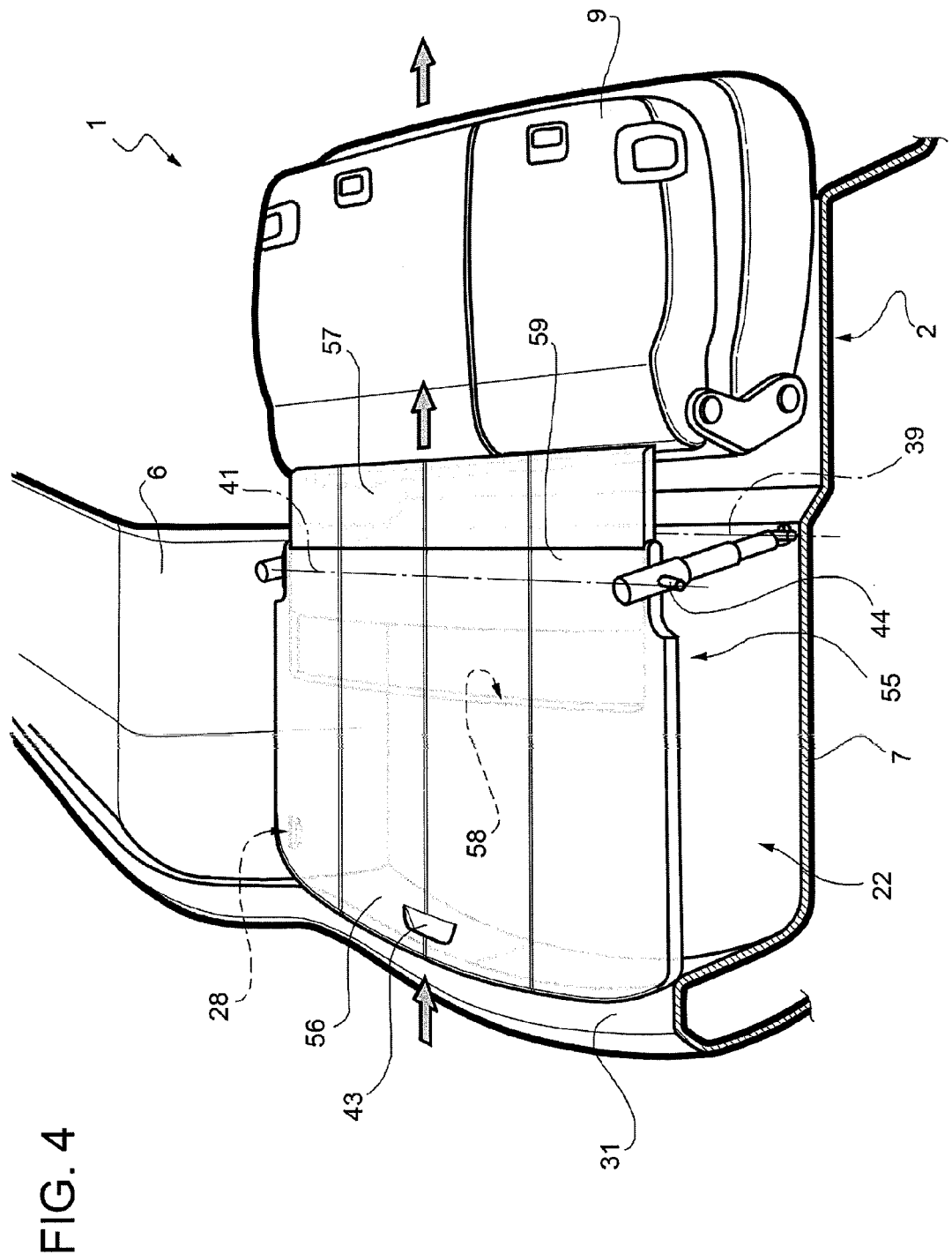
FIG. 4 is similar to FIG. 3 and shows a variant of the loading floor according to the present invention.

FIG. 4 shows another variant of the vehicle 1, where the various components have been indicated, where possible, with the same reference numerals as in FIGS. 1-3. In this case, the rear seat 9 can slide in a longitudinal direction to vary the length of the luggage compartment 4 and the underlying space 22. At the same time, the loading floor 25 is substituted by loading floor 55 comprising a rear panel 56 and at least one front panel 57.

Panel 57 is connected to panel 56 in such a way as to slide parallel to the latter and cover the possible gap between the front edge of panel 56 and the rear seat 9, and therefore to change the length of surface 21 depending on the longitudinal position of the rear seat 9 when the loading floor 55 is placed in its raised position.

Preferably, panel 57 slidingly engages a seat 58 made in a front portion 59 of panel 56 and projects from the seat 58 so as to rest against the rear seat 9.

In consequence, the length of the loading floor 25 can be manually varied to adapt the unit 20 to the longitudinal movement of the rear seat 9. In particular, panel 57 is only supported by the guide of panel 56, without brackets and/or guides on the sides 6. Preferably, a releasable catch system (not shown) is provided to secure the panel 57 in a retracted position with respect to panel 56 (for example, completely inside the seat 58, if the latter is provided), in particular to enable easily putting the loading floor 55 back into its lowered position.

In the case where the rear seat 9 is of the split type, the front panel 57 is substituted by two panels of substantially the same length, arranged side by side and guided independently from the rear panel 56.

Appendages 44 are also provided on the end portions 40 of the levers 37, which are hinged to the sides of the front portion 59, in the variant in FIG. 4.

From the foregoing, it is evident that the loading floor 25 or 55 is supported in the raised position in a stable manner and without stressing the levers 37 end-on, thanks to the coupling of the latter to the front brackets 29.

For the same reason, the loading floor 25 or 55 can be rotated to access the underlying space 22 while the levers 37 remain in a stable position.

In addition, the characteristics of the unit 20 permit having a relatively compact and comparatively easy to use solution with regard to moving the loading floor 25 between the raised and lowered positions. In fact, it is possible to move the loading floor 25 up and down using just one hand, by grasping the grip portion 43.

Furthermore, the fact of making the levers 37 extendable permits coupling the end portions 40 directly to the loading floor 25 by hinges and so avoids having guide channels in the loading floor 25 for extracting the loading floor 25 towards the rear opening 5 with respect to axis 39 during the manoeuvres of lifting to the raised position. In this way, besides reducing the clearances and the number of components, the loading floor 55 proves to be relatively rigid for supporting the weight of the luggage.

Finally, it is evident that modifications and variations can be applied to the vehicle 1 described and illustrated herein without leaving the scope of protection of the present invention, as defined in the appended claims.

In particular, the shape of the appendages 44 and/or the brackets 29 and 30 could be different from that shown by way of example.

The invention claimed is:

1. A vehicle comprising:
a structure defining a luggage compartment;
an additional support unit arranged in said luggage compartment and comprising:
a) a loading floor height-adjustable between a lowered position and at least one raised position;
b) support means connected to said structure in a fixed position, to support said loading floor in the raised position;
c) lever means having a first end portion hinged to a fixed structure about a first horizontal axis and a second end portion hinged to an attachment portion of said loading floor about a second horizontal axis;
said first and second horizontal axes being set apart from, and parallel to, each other, and being orthogonal to a longitudinal direction of travel of the vehicle;
said loading floor, when in the raised position, being rotatable upwards about said second horizontal axis;
wherein said lever means have two shoulders that engage said support means when said loading floor is placed in the raised position.

2. The vehicle according to claim 1, wherein said shoulders are carried by said second end portion.

3. The vehicle according to claim 2, wherein said shoulders are fixed with respect to said second end portion.

4. The vehicle according to claim 1, wherein said shoulders are defined by respective appendages, which, at least in one configuration, project from said lever means in opposite directions along a transversal direction parallel to said first and second horizontal axes.

5. The vehicle according to claim 4, wherein said transversal direction coincides with said second horizontal axis.

6. The vehicle according to claim 4, wherein said support means comprise retaining means for keeping, in a releasable manner, said appendages in a fixed longitudinal position.

7. The vehicle according to claim 6, wherein said support means comprise, for each appendage, a lower wall and an upper wall defining between them a seat suitable for being engaged by said appendage.

8. The vehicle according to claim 1, wherein said lever means are constituted by two levers arranged on opposite lateral sides of said attachment portion.

9. The vehicle according to claim 1, wherein said loading floor is defined by a single panel; said attachment portion being defined by a front end portion of said single panel.

10. The vehicle according to claim 1, wherein said loading floor comprises a rear panel and at least one front panel, movable with respect to said rear panel to cover a possible gap with regard to a slidable rear seat of the vehicle; said attachment portion being defined by a front end portion of said rear panel.

11. The vehicle according to claim 1, wherein the distance between said first and second horizontal axes is variable.

* * * * *